(12) United States Patent
Mayuzumi et al.

(10) Patent No.: US 11,267,525 B2
(45) Date of Patent: Mar. 8, 2022

(54) SADDLE RIDING VEHICLE

(71) Applicant: HONDA MOTOR CO., LTD., Tokyo (JP)

(72) Inventors: Kei Mayuzumi, Wako (JP); Kazuya Sawasaki, Wako (JP); Souichiro Makino, Wako (JP); Yuki Kanemura, Wako (JP); Keita Mikura, Wako (JP); Masaomi Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 16/583,415

(22) Filed: Sep. 26, 2019

(65) Prior Publication Data

US 2020/0102034 A1 Apr. 2, 2020

(30) Foreign Application Priority Data

Sep. 28, 2018 (JP) .............................. JP2018-185182

(51) Int. Cl.
*B62J 25/00* (2020.01)
(52) U.S. Cl.
CPC ..................................... *B62J 25/00* (2013.01)
(58) Field of Classification Search
CPC .................................. B62J 25/00; B62J 25/06
See application file for complete search history.

(56) References Cited

U.S. PATENT DOCUMENTS

| 10,899,411 | B2 * | 1/2021 | Kojika | .................... B62K 23/08 |
| 2009/0008900 | A1 * | 1/2009 | Ishikawa | .................. B62J 25/00 280/291 |
| 2009/0206624 | A1 * | 8/2009 | Mann | ....................... B62J 25/00 296/37.1 |
| 2015/0137479 | A1 | 5/2015 | Gershteyn | |
| 2019/0092415 | A1 * | 3/2019 | Campbell | ................ B62J 25/00 |

(Continued)

FOREIGN PATENT DOCUMENTS

| CN | 201030906 | 3/2008 |
| CN | 102407900 | 4/2012 |
| CN | 202345845 | 7/2012 |

(Continued)

OTHER PUBLICATIONS

Chinese Office Action for Chinese Patent Application No. 201910922047.6 dated Dec. 3, 2020.

(Continued)

*Primary Examiner* — Tony H Winner
(74) *Attorney, Agent, or Firm* — Amin, Turocy & Watson, LLP

(57) ABSTRACT

A saddle riding vehicle includes a pivot frame configured to support a swing arm, a step bracket attachment section continuous with a lower side of the pivot frame, and a step bracket attached to an outer surface of the step bracket attachment section outside in a vehicle width direction and configured to support a step, wherein the outer surface of the step bracket attachment section is provided further inside in the vehicle width direction than an outer surface of the pivot frame outside in the vehicle width direction, and an outer surface of the step bracket outside in the vehicle width direction is disposed to be arranged on the same surface as the outer surface of the pivot frame.

7 Claims, 14 Drawing Sheets

(56) References Cited

U.S. PATENT DOCUMENTS

2021/0024162 A1* 1/2021 Lindloff .................. B62J 25/06

FOREIGN PATENT DOCUMENTS

| | | |
|---|---|---|
| CN | 203172790 | 9/2013 |
| JP | 58-43580 | 3/1983 |
| JP | 01-111592 | 4/1989 |
| JP | 02-124781 | 10/1990 |
| JP | 05-085457 | 4/1993 |
| JP | 05-124563 | 5/1993 |
| JP | 05-270465 | 10/1993 |
| JP | 2002-211469 | 7/2002 |
| JP | 2002-211471 | 7/2002 |
| JP | 2007-314101 | 12/2007 |
| JP | 2010-126054 | 6/2010 |
| JP | 2012-158270 | 8/2012 |
| JP | 2016-007925 | 1/2016 |
| WO | 2017/134831 | 8/2017 |

OTHER PUBLICATIONS

Japanese Office Action for Japanese Patent Application No. 2018-185182 dated Jun. 22, 2021.
Chinese Office Action for Chinese Patent Application No. 201910922047.6 dated Jul. 14, 2021.

* cited by examiner

SADDLE RIDING VEHICLE

CROSS-REFERENCE TO RELATED APPLICATION

Priority is claimed on Japanese Patent Application No. 2018-185182, filed Sep. 28, 2018, the content of which is incorporated herein by reference.

BACKGROUND OF THE INVENTION

Field of the Invention

The present invention relates to a saddle riding vehicle.

Description of Related Art

In the related art, a motorcycle includes a step on which a driver's feet are placed, and a pillion step on which the feet of a passenger on the rear section are placed. The step on which the feet of the occupant are placed is attached to a vehicle body frame of the motorcycle via a step bracket. For example, Japanese Unexamined Patent Application, First Publication No. H05-85457 discloses a configuration in which a step bracket for a pillion step is coupled to a support plate provided on an outer surface of a vehicle body frame.

SUMMARY OF THE INVENTION

However, in the related art, since the step bracket is coupled to the support plate provided on the outer surface of the vehicle body frame, the step bracket overhangs outward from the vehicle body frame. Thus, interference easily occurs between the occupant's feet placed on the step and the step bracket, and the occupant may feel discomfort.

In consideration of the above-mentioned circumstances, an object according to the present invention is directed to providing a saddle riding vehicle capable of minimizing interference between an occupant's feet placed on a step and a step bracket.

In order to accomplish the above-mentioned object, the present invention employs the following aspects.

<1> A saddle riding vehicle according to an aspect of the present invention includes a pivot frame configured to support a swing arm, a step bracket attachment section continuous with a lower side of the pivot frame, and a step bracket attached to an outer surface of the step bracket attachment section outside in a vehicle width direction and configured to support a step, wherein the outer surface of the step bracket attachment section is provided further inside in the vehicle width direction than outer surfaces of the pivot frame outside in the vehicle width direction, and an outer surface of the step bracket outside in the vehicle width direction is disposed to be arranged on the same surface as the outer surfaces of the pivot frame.

<2> In the above-mentioned aspect <1>, a head pipe, a pair of left and right main frame pipes extending from the head pipe toward a rear side of the vehicle, a pair of left and right pivot plate members joined to rear lower end portions of the pair of left and right main frame pipes and constituting the pivot frame, and a pair of left and right bracket attachment members joined to lower ends of the pair of left and right pivot plate members and constituting the step bracket attachment section may be provided, and each of the bracket attachment members may be formed to be thinner than each of the pivot plate members in the vehicle width direction.

<3> In the above-mentioned aspect <2>, the bracket attachment members may be forged members formed of a metal-based material, and welded to the pivot plate member.

<4> In the above-mentioned aspect <2> or <3>, the pair of left and right bracket attachment members may be connected to each other via a cross pipe extending in the vehicle width direction between the pair of left and right bracket attachment members.

<5> In any one of the above-mentioned aspects <1> to <4>, a main frame configured to support the pivot frame, a seat frame extending toward a rear side of the main frame and configured to support a seat, a rear frame configured to support vehicle parts behind the seat, and a pair of left and right pillion step brackets configured to support a pillion step may be provided, and an attachment section configured to fix the rear frame and the pillion step brackets together may be provided on the seat frame.

<6> In the above-mentioned aspect <5>, the rear frame and the pillion step brackets may be attached to the attachment section of the seat frame from an inner side in the vehicle width direction.

<7> In the above-mentioned aspect <5> or <6>, the seat frame may include a seat frame pipe extending rearward from the main frame, and a subsidiary frame pipe extending rearward from the main frame and joined to a longitudinal intermediate section of the seat frame pipe, the attachment section may be provided on the longitudinal intermediate section of the seat frame pipe, and the attachment section may be provided on an attachment member joined to cross the seat frame pipe and the subsidiary frame pipe.

According to the above-mentioned aspect <1>, since the outer surface of the step bracket attachment section outside in the vehicle width direction is disposed further inside in the vehicle width direction than the outer surface of the pivot frame outside in the vehicle width direction, the step bracket can be attached using a recess in the vehicle width direction formed by the step bracket attachment section. Since the outer surface of the step bracket outside in the vehicle width direction is disposed to be flush with the outer surface of the pivot frame outside in the vehicle width direction, outward overhanging of the step bracket in the vehicle width direction can be minimized. Accordingly, it is possible to minimize discomfort to an occupant due to interference between the feet of the occupant placed on the step and the step bracket. Since the outer surface of the step bracket and the outer surface of the pivot frame are flush with each other, differentiation of the appearance of the step bracket is minimized and the sense of unity with the vehicle body is increased, and thus, design properties can be improved.

According to the above-mentioned aspect <2>, since the thickness of the bracket attachment member in the vehicle width direction is smaller than the thickness of the pivot plate member in the vehicle width direction, the outer surface of the step bracket attachment section outside in the vehicle width direction can be disposed further inside in the vehicle width direction than the outer surface of the pivot frame outside in the vehicle width direction, and outward overhanging of the step bracket in the vehicle width direction can be minimized.

According to the above-mentioned aspect <3>, the pivot frame can be reinforced by welding and coupling the bracket attachment member to the pivot plate member while securing strength and rigidity using the bracket attachment member as the forged member and increasing support rigidity of the step bracket.

According to the above-mentioned aspect <4>, since the left and right bracket attachment members are connected to each other by the cross pipe, the step bracket attachment section can be strengthened to increase vehicle body rigidity. Since both ends of the cross pipe are supported by the left and right bracket attachment members, support rigidity when an engine, a suspension, and the like, are supported by the cross pipe can be increased.

According to the above-mentioned aspect <5>, since the attachment section configured to fix the rear frame and the pillion step bracket together is provided on the seat frame, a structure for attaching the rear frame and the pillion step bracket can be simplified, and the number of parts and installation man-hours can be reduced.

According to the above-mentioned aspect <6>, since the rear frame and the pillion step bracket are attached from an inner side in the vehicle width direction, the attachment structure of the rear frame and the pillion step bracket is not exposed to the outside in the vehicle width direction, and design properties can be improved. Even when the rear frame and the pillion step bracket are removed, since the attachment section of the rear frame and the pillion step bracket are not exposed to the outside in the vehicle width direction, design properties can be improved.

According to the above-mentioned aspect <7>, since the attachment section to which the rear frame and the pillion step bracket are attached is provided on the attachment member joined to the seat frame pipe and the subsidiary frame pipe to cross them at the joining position thereof, the joining portion of the seat frame pipe and the subsidiary frame pipe can be reinforced by the attachment member while increasing support rigidity of the rear frame and the pillion step bracket.

DETAILED DESCRIPTION OF THE INVENTION

Figure 1:
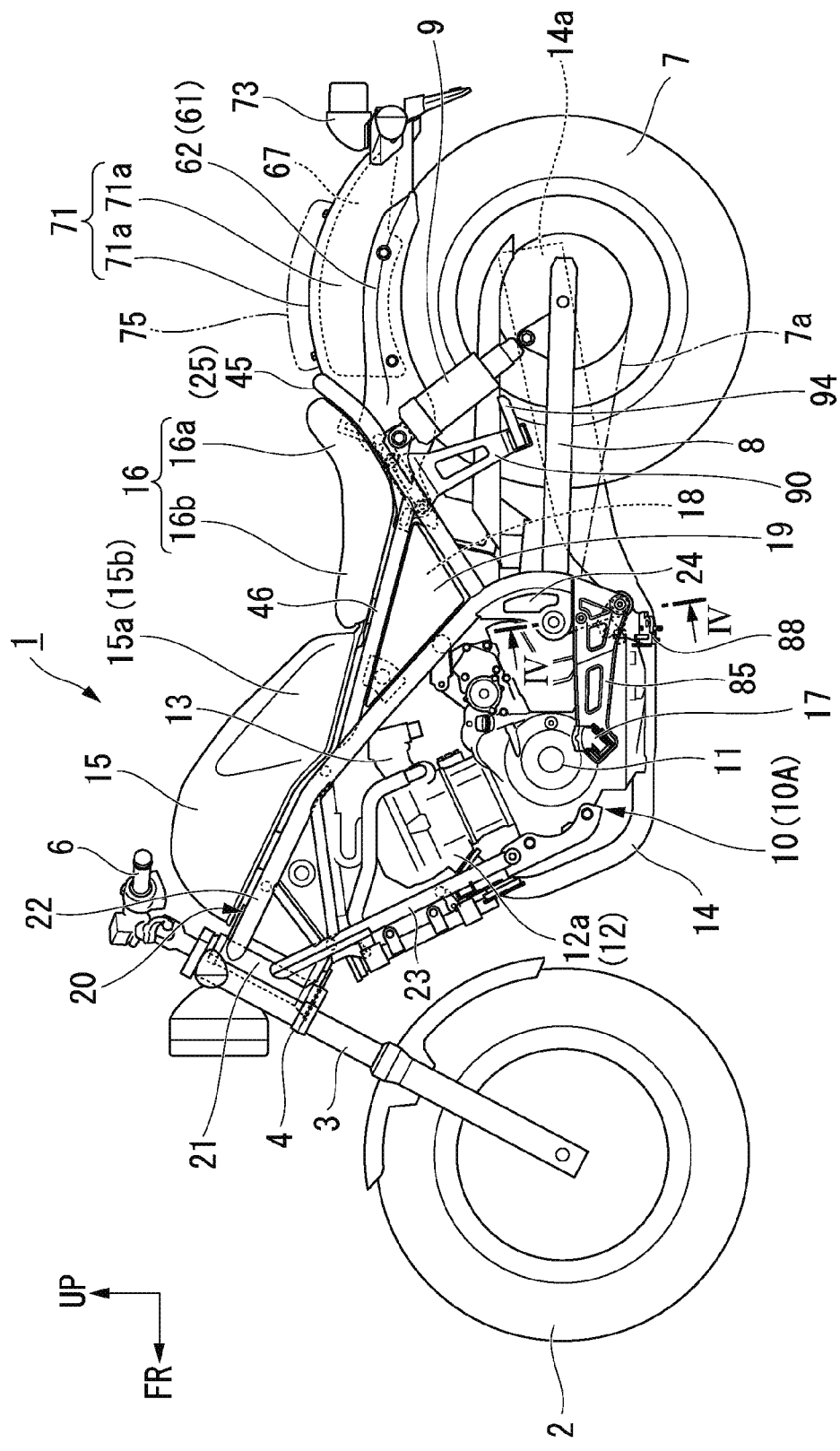
FIG. 1 is a left side view of a motorcycle according to an embodiment of the present invention.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle, and a line CL indicates a line showing a lateral center of a vehicle body.

As shown in FIG. 1, a motorcycle (a saddle riding vehicle) 1 is a cruiser type vehicle obtained by making a vehicle body thereof low and long. A front wheel 2 of the motorcycle 1 is supported by lower end portions of a pair of left and right front forks 3 inclined as upper sections go rearward from a front section of the vehicle body. The upper sections of the left and right front forks 3 are supported by a front end portion of a vehicle body frame 20 via a steering stem 4. A bar handle 6 for steering is attached to an upper section of the steering stem 4.

A rear wheel 7 of the motorcycle 1 is supported by a rear end portion of a swing arm 8 extending forward and rearward below a rear section of the vehicle body. A front end portion of the swing arm 8 is vertically and swingably supported below a rear section of the vehicle body frame 20. The rear wheel 7 is connected to a power unit 10A that is a prime mover of the motorcycle 1 via, for example, a chain type transmission mechanism 7a disposed at the rear section of the vehicle body on the right side. Lower end portions of a pair of left and right rear cushions 9 are connected to rear sections of left and right arms of the swing arm 8.

The power unit 10A is mounted inside the vehicle body frame 20. The power unit 10A includes an engine (an internal combustion engine) 10 having a crankshaft provided in a vehicle width direction (a leftward/rightward direction). The engine 10 has a cylinder 12 standing upward from a front section of a crank case 11. A rear section of the crank case 11 is a gearbox case configured to accommodate a gearbox.

An intake passage 13 including a throttle section or the like is connected to a rear section of a cylinder head 12a of the cylinder 12. A base end portion of an exhaust pipe 14 is connected to a front section of the cylinder head 12a. The exhaust pipe 14 is curved rearward in front of the engine 10, routed rearward below the engine 10, and for example, connected to an exhaust muffler 14a disposed at the rear section of the vehicle body on the right side.

A fuel tank 15 configured to store fuel for the engine 10 is disposed above the engine 10. A seat 16 on which a driver sits is disposed behind the fuel tank 15. A pair of left and right steps 17 on which a driver's feet are placed are disposed below a front side of the seat 16.

Auxiliary equipment 18 such as an air cleaner or the like is disposed below a rear section of the fuel tank 15 and a front section 16b of the seat 16. The auxiliary equipment 18 is supported inside the vehicle body frame 20, and covered with side covers 19 attached to the vehicle body frame 20 left and right outer sides.

A rear fender 71 extends rearward from the seat 16, and a pillion seat (a rear seat) 75 for a passenger on the rear section is disposed on the rear fender 71. Pillion steps (rear steps) 94 on which the legs of a passenger on the rear section are placed are disposed below a front side of the pillion seat 75.

Figure 2:
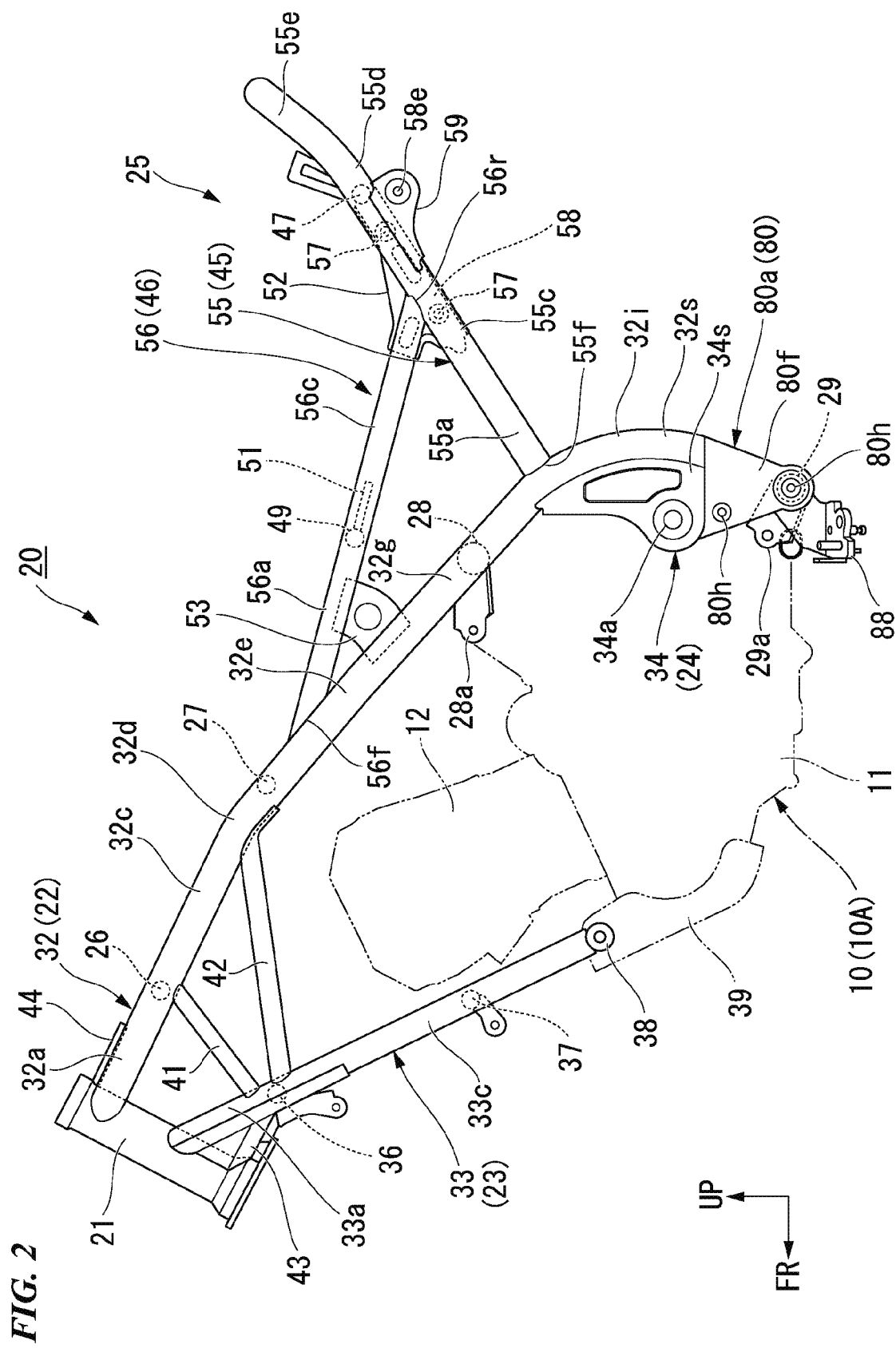
FIG. 2 is a left side view of a vehicle body frame of the motorcycle.
Figure 3:
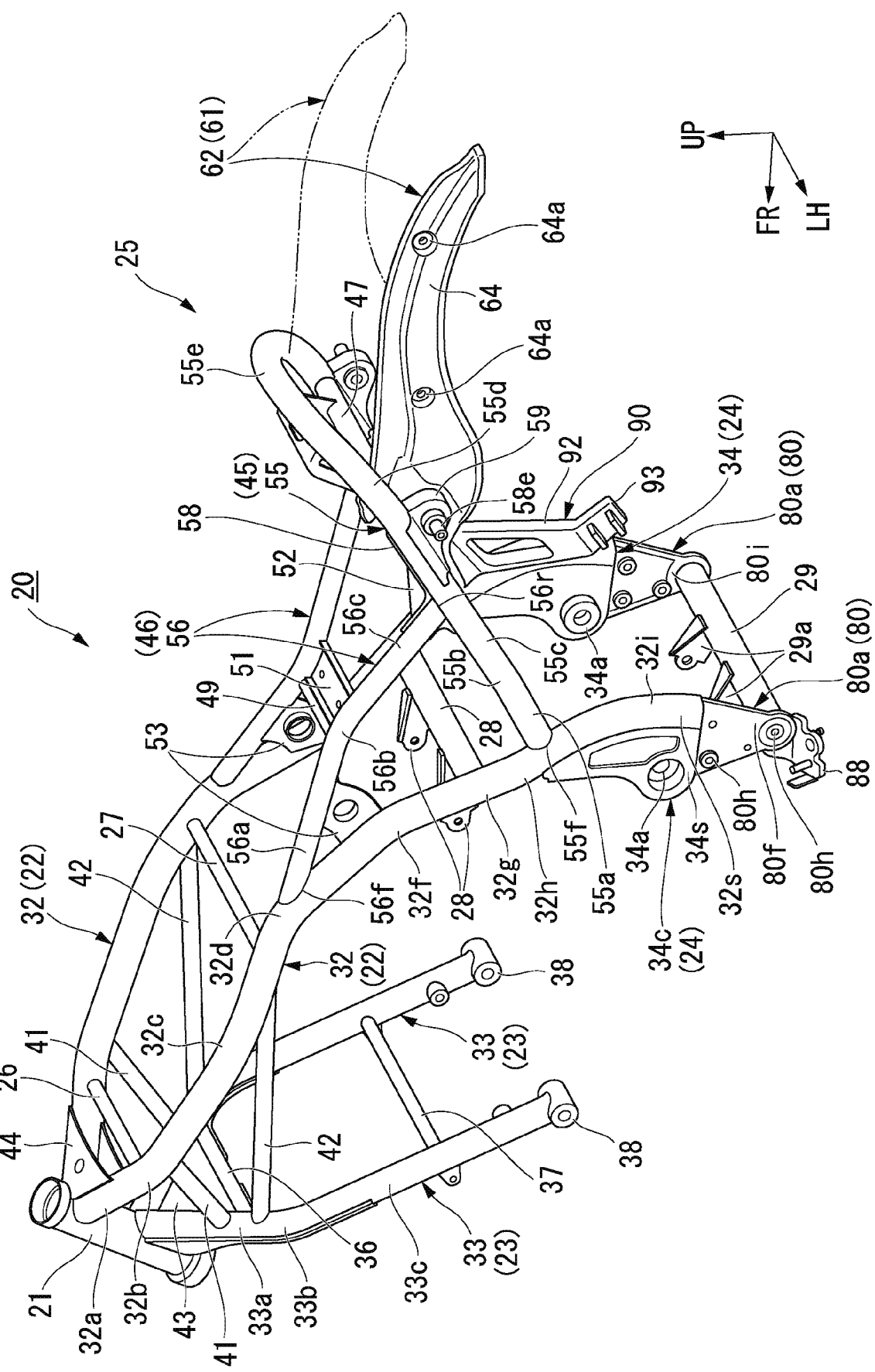
FIG. 3 is a perspective view of the vehicle body frame.

Referring to FIG. 2 and FIG. 3 together, the vehicle body frame 20 is formed by integrally coupling steel members of a plurality of types through welding or the like.

The vehicle body frame 20 includes a head pipe 21 disposed on a front end portion thereof and configured to support the steering stem 4, a main frame 22 including a pair of left and right main frame pipes 32 branching off from an upper rear side of the head pipe 21 toward left and right sides and extending downward and rearward when seen in side view, a down frame 23 including a pair of left and right down frame pipes 33 branching off from a lower rear side of the head pipe 21 toward left and right sides and extending rearward and downward to form a steeper inclination than that of the main frame pipes 32 when seen in side view, a pivot frame 24 including a pair of left and right pivot plate members 34 joined to rear sections of the left and right main frame pipes 32 and configured to support a front end portion of the swing arm 8, and a seat frame 25 having a front end portion joined to a rear upper section of the main frame 22 and extending rearward.

The head pipe 21 has a cylindrical shape, and a central axis is disposed at a center in the vehicle width direction and disposed to be inclined as an upper section goes rearward when seen in side view.

The left and right main frame pipes 32 include first extension sections 32a extending rearward from an upper rear side of the head pipe 21, extending to be inclined downward and rearward when seen in side view and extending to be inclined outward to the left and right when seen in plan view, second extension sections 32c continuous with rear sides of the first extension sections 32a via first bent sections 32b, extending to form a linear shape with the first extension sections 32a when seen in side view and extending to be more gently inclined outward to the left and right than the first extension sections 32a when seen in plan view, third extension sections 32e continuous with rear sides of the second extension sections 32c via second bent sections 32d, extending more steeply inclined downward and rearward than the second extension sections 32c when seen in side view and extending to be inclined inward to the left and right when seen in plan view, fourth extension sections 32g continuous with rear sides of the third extension sections 32e via third bent sections 32f, extending to form a linear shape with the third extension sections 32e when seen in side view and extending inclined outward to the left and right when seen in plan view, and rear curved sections (rear lower end portions) 32i continuous with rear sides of the fourth extension sections 32g via fourth bent sections 32h, extending to be curved forward and downward from a state of extending to form a linear shape with the fourth extension sections 32g when seen in side view and extending to be substantially parallel to side surfaces of the vehicle body when seen in plan view. Further, the side surfaces of the vehicle body are planes perpendicular to the vehicle width direction (the leftward/rightward direction).

The left and right main frame pipes 32 are integrally formed of round steel pipes through bending or the like.

Figure 4:
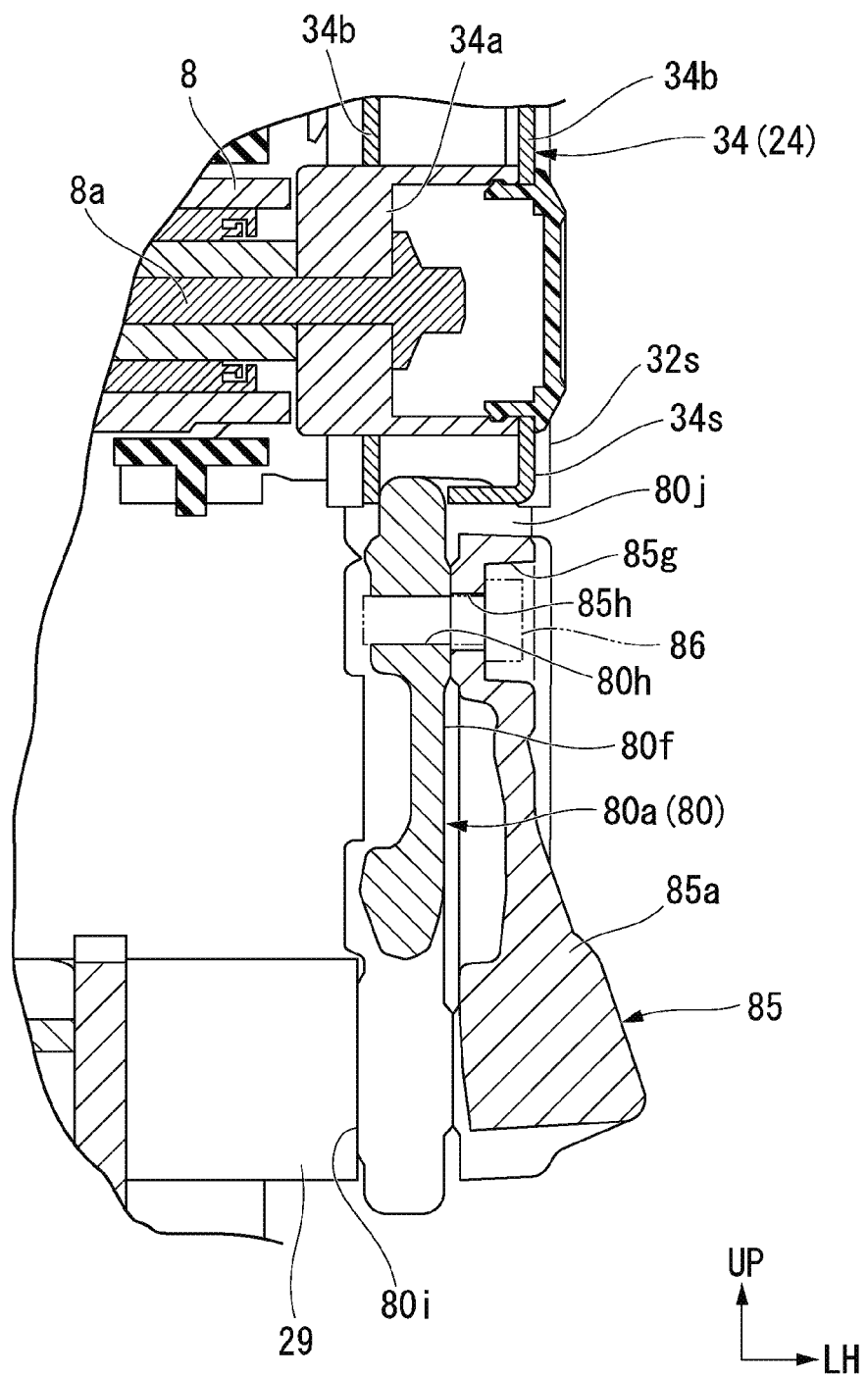
FIG. 4 is a cross-sectional view taken along line IV-IV in FIG. 1.
Figure 5:
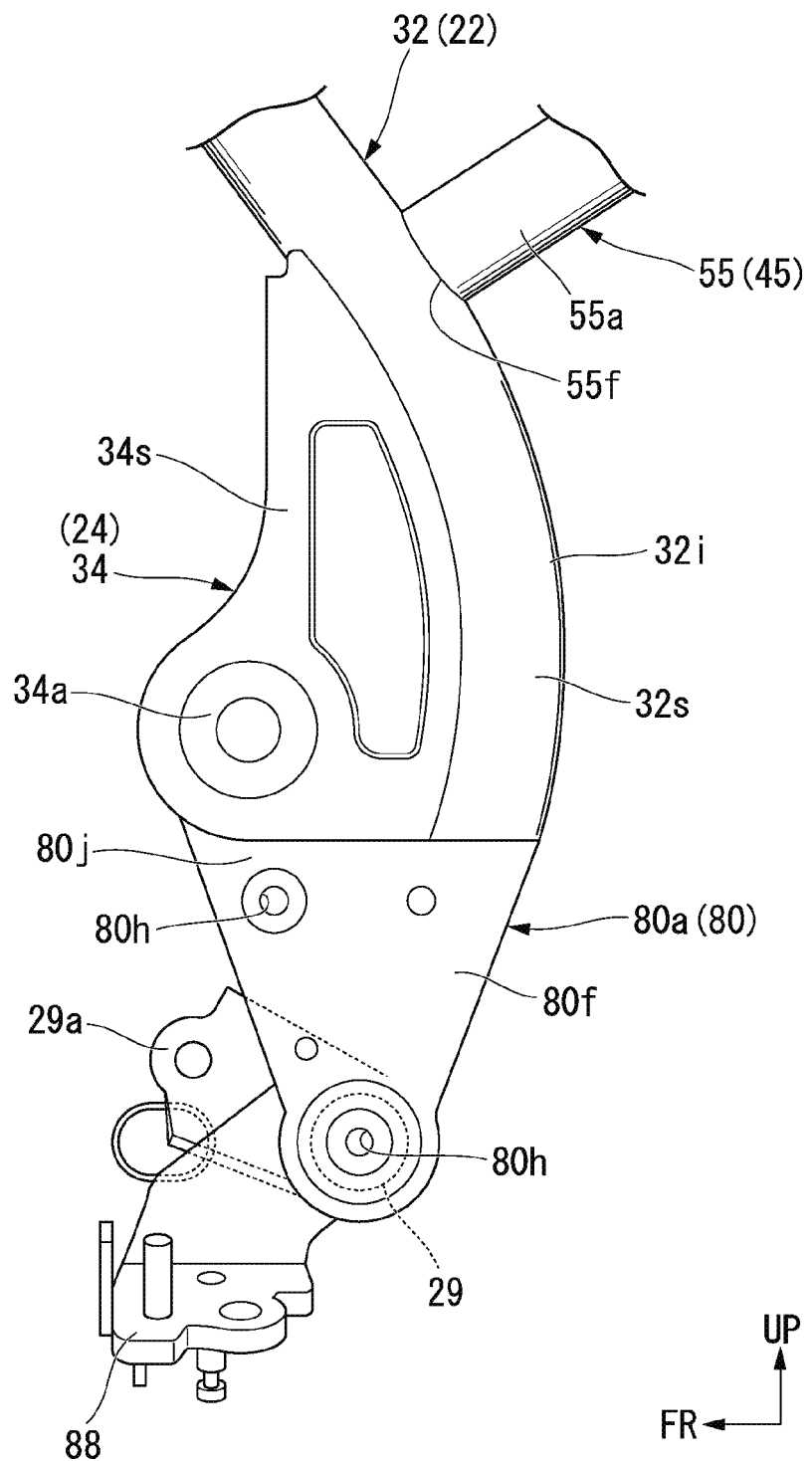
FIG. 5 is a left side view of a step bracket attachment section of the vehicle body frame.

Referring to FIG. 4 and FIG. 5 together, the pivot plate members 34 are joined to front surface sides (inner circumferential sides) of the rear curved sections 32i. Pivot sections 34a configured to support a front end portion of the swing arm 8 via a swing shaft (a pivot shaft) 8a in the vehicle width direction are provided on front sections of the left and right pivot plate members 34. The pivot plate members 34 are formed of a steel plate through pressing, casting, or the like.

As shown in FIG. 4, in the embodiment, the pivot plate members 34 include a pair of plate parts 34b formed of steel plates through pressing and disposed parallel to each other with an interval therebetween in the vehicle width direction. The pivot plate members 34 are welded to front surface sides of the rear curved sections 32i. Outer surfaces 34s of the pivot plate members 34 are disposed to be flush with outer surfaces 32s of the rear curved sections 32i or disposed further inside than the outer surfaces 32s in the vehicle width direction. The plate parts 34b are formed of, for example, steel plates through pressing. The pair of plate parts 34b are welded integrally to each other. Rear lower end portions (the rear curved sections 32i) of the left and right main frame pipes 32 function as a part of the pivot frame 24. The rear lower end portions of the left and right main frame pipes 32 may be different from the rear curved sections 32i that are curved forward and downward.

As shown in FIG. 2 to FIG. 7, step bracket attachment sections 80 including a pair of left and right bracket attachment members 80a are provided on the rear curved sections 32i of the pair of left and right main frame pipes 32 and lower ends of the pivot plate members 34. The bracket attachment members 80a are forged members formed of the same metal-based material as the main frame pipes 32 and the pivot plate members 34, and are coupled to the rear curved sections 32i of the main frame pipes 32 and the lower ends of the pivot plate members 34 through welding. The step bracket attachment sections 80 in addition to the bracket attachment members 80a form a thick plate shape crossing (perpendicular to) the vehicle width direction, and are formed in an inverted triangular shape when seen in side view.

The step bracket attachment sections 80 (the bracket attachment members 80a) are continuous with a lower side of the pivot frame 24. The step bracket attachment sections 80 are provided with a smaller width than the pivot frame 24 in the vehicle width direction. The left and right bracket attachment members 80a that constitute the step bracket attachment sections 80 are provided to be thinner than the rear curved sections 32i of the left and right main frame pipes 32 and the left and right pivot plate members 34 that constitute the pivot frame 24 in the vehicle width direction. The bracket attachment member 80a has a thickness about a half of a thickness in the vehicle width direction of each of the rear curved sections 32i and the pivot plate members 34 in the vehicle width direction.

Joining base sections 80j in which a thickness in the vehicle width direction is substantially the same as the thickness in the vehicle width direction of each of the rear curved sections 32i and the pivot plate members 34 are formed on upper end portions of the bracket attachment members 80a. Upper surfaces of the joining base sections 80j are welded to lower ends of the rear curved sections 32i and the pivot plate members 34. In the step bracket attachment sections 80, in addition to the bracket attachment members 80a, outer surfaces 80f directed outward in the vehicle width direction are disposed at positions further inside in the vehicle width direction than the outer surfaces 32s and 34s outside the rear curved sections 32i and the pivot plate members 34 (the pivot frame 24) in the vehicle width direction. A plurality of female screw holes 80h in the vehicle width direction are formed in the bracket attachment members 80a, and the female screw holes 80h open in the outer surfaces 80f of the bracket attachment members 80a.

Step brackets 85 configured to support the steps 17 on which an occupant's feet are placed are attached to the outer surfaces 80f of the pair of left and right bracket attachment members 80a. The step brackets 85 are integrally formed of a metal-based material such as aluminum alloy or the like through casting or the like. The step brackets 85 integrally include base sections 85a fixed to the outer surfaces 80f of the bracket attachment members 80a, and step support sections 85b extending from the base sections 85a toward a front side of the vehicle and configured to support the steps 17 on tip portions thereof.

Bolt insertion holes 85*h* are formed in the base sections 85*a* at positions corresponding to the plurality of female screw holes 80*h* of the bracket attachment members 80*a*. The bolt insertion holes 85*h* have countersinks 85*g* on the side of outer surfaces 85*f* directed outward in the vehicle width direction. The step brackets 85 are fastened and fixed to the step bracket attachment sections 80 in addition to the bracket attachment members 80*a* by inserting bolts 86 through the bolt insertion holes 85*h* from the outside in the vehicle width direction and screwing and fastening the bolts 86 to the female screw holes 80*h* of the bracket attachment members 80*a*. In this state, the outer surfaces 85*f* of the base sections 85*a* of the step brackets 85 outside in the vehicle width direction are substantially flush with the outer surfaces 32*s* and 34*s* of the pivot frame 24. In other words, the outer surfaces 85*f* of the base sections 85*a* of the step brackets 85 and the outer surfaces 32*s* and 34*s* of the pivot frame 24 are disposed to be flush with each other. Further, in other words, the outer surfaces 85*f* of the base sections 85*a* of the step brackets 85 and the outer surfaces 32*s* and 34*s* of the pivot frame 24 are disposed to be parallel to each other on substantially the same straight line in an upward/downward direction when seen in the forward/rearward direction.

In addition, head sections of the bolts 86 are accommodated in the countersinks 85*g* of the step brackets 85, and prevented from protruding outward from the outer surfaces 85*f* in the vehicle width direction. The base sections 85*a* have external forms of being continuous with the rear curved sections 32*i* and the pivot plate members 34.

As shown in FIG. 2 and FIG. 3, a first cross frame 26 bridges between front sections of the second extension sections 32*c* of the left and right main frame pipes 32.

A second cross frame 27 bridges between front sections of the third extension sections 32*e* of the left and right main frame pipes 32.

A third cross frame 28 bridges between rear sections of the fourth extension sections 32*g* of the left and right main frame pipes 32.

A fourth cross frame (a cross pipe) 29 bridges between lower end portions of the left and right bracket attachment members 80*a*. The fourth cross frame 29 extends in the vehicle width direction, and both ends thereof are coupled to and supported by inner surfaces 80*i* directed inward in the vehicle width direction of the left and right step bracket attachment sections 80 through bolt fastening or welding. The left and right bracket attachment members 80*a* are connected to each other via the fourth cross frame 29.

The cross frames 26 to 29 are formed of round steel pipes extending in the leftward/rightward direction.

A rear upper mount bracket 28*a* extending forward and downward to support a rear upper side of the crank case 11 is coupled to the third cross frame 28.

A rear lower mount bracket 29*a* extending forward to support a rear lower side of the crank case 11 is joined to the fourth cross frame 29. A side stand bracket 88 configured to pivotably support a base end portion of a side stand (not shown) is joined to a left side of the fourth cross frame 29.

The vehicle body frame 20 is a so-called diamond frame structure using the engine 10 (the power unit 10A) as a part of the frame structure. The engine 10 is mounted to be surrounded by the main frame 22, the down frame 23 and the pivot frame 24 when seen in side view, and connects a lower section of the down frame 23, a rear section of the main frame 22 and the pivot frame 24.

In the motorcycle 1, while the cylinder 12 of the engine 10 is not connected to the vehicle body frame 20, torsional rigidity of the vehicle body frame 20 is improved by providing the second cross frame 27 between the left and right main frame pipes 32.

Left and right down frame pipes 33 include first extension sections 33*a* extending rearward from a lower rear side of the head pipe 21 to be inclined downward and rearward when seen in side view and extending to be inclined outward to the left and right when seen in plan view, and second extension sections 33*c* continuous with lower sides of the first extension sections 33*a* via first bent sections 33*b*, extending to form a linear shape with the first extension sections 33*a* when seen in side view and extending to be substantially parallel to side surfaces of the vehicle body.

The left and right down frame pipes 33 are integrally formed of round steel pipes through bending or the like.

A first cross frame 36 bridges between lower sections of the first extension sections 33*a* of the left and right down frame pipes 33.

A second cross frame 37 bridges between vertical intermediate sections of the second extension sections 33*c* of the left and right down frame pipes 33.

Further, "intermediate" used in the embodiment includes a range inside between both ends of an object in addition to a center between both ends of the object.

The cross frames 36 and 37 are formed of round steel pipes extending in the leftward/rightward direction.

Cylindrical boss members 38 formed in the leftward/rightward direction are coupled to lower end portions of the left and right down frame pipes 33. An upper end portion of a front engine hanger 39 configured to support a front end portion of the crank case 11 of the engine 10 is fixed between the left and right boss members 38. The front engine hanger 39 is formed of, for example, a steel plate through pressing.

First gusset frames 41 extending to be inclined upward and rearward when seen in side view are bridged between front sections of the left and right main frame pipes 32 (front sections of the second extension sections 32*c*) and upper sections of the left and right down frame pipes 33 (lower sections of the first extension sections 33*a*).

Second gusset frames 42 extending to be more gently inclined upward and rearward than the first gusset frames 41 when seen in side view are bridged between longitudinal intermediate sections of the left and right main frame pipes 32 (the second bent sections 32*d*) and upper sections of the left and right down frame pipes 33 (lower sections of the first extension sections 33*a*) below the left and right first gusset frames 41.

The gusset frames 41 and 42 are formed of round steel pipes extending in a linear shape.

A lower gusset 43 formed to bury an acute portion between the upper sections of the left and right down frame pipes 33 (the first extension sections 33*a*) and the lower section of the head pipe 21 when seen in side view is bridged therebetween. The lower section of the lower gusset 43 extends to overlap the first bent sections 33*b* of the left and right down frame pipes 33.

The lower gusset 43 is formed of, for example, a steel plate through pressing.

A gusset plate 44 having a flat plate shape and disposed along an upper edge of the main frame 22 when seen in side view bridges between the front sections of the left and right main frame pipes 32 (the front sections of the first extension sections 32*a*).

The seat frame 25 includes a seat frame main body 45 including a pair of left and right side pipe sections 55 extending rearward and upward behind upper sections of the rear curved sections 32*i* of the left and right main frame pipes 32, and a subsidiary seat frame 46 including a pair of left and right subsidiary frame pipes 56 extending rearward and downward behind the longitudinal intermediate sections of the left and right main frame pipes 32 (the front sections of the second extension sections 32c).

The seat frame main body 45 is formed in a U shape that opens forward when seen in plan view, and front end portions 55f of the left and right side pipe sections 55 are joined to upper sections of the rear curved sections 32i of the left and right main frame pipes 32, respectively.

The side pipe sections 55 include first extension sections 55a extending rearward from upper sections of the rear curved sections 32i of the main frame pipes 32 to be inclined upward and rearward when seen in side view and extending to be inclined inward to the left and right when seen in plan view, second extension sections 55c continuous with rear sides of the first extension sections 55a via first bent sections 55b, extending to form a linear shape with the first extension sections 55a when seen in side view and extending to be more gently inclined inward to the left and right than the first extension sections 55a when seen in plan view, and rear curved sections 55e continuous with rear sides of the second extension sections 55c via second bent sections 55d, extending to be more steeply inclined upward than the second extension sections 55c when seen in side view, and curved in an arc shape toward left and right inner sides when seen in plan view.

The left and right rear curved sections 55e are integrally continuous with each other and formed in a semi-circular shape protruding rearward when seen in plan view. The left and right rear curved sections 55e are formed in the rear section of the seat frame main body 45 along an external form of a rear section 16a of the seat 16 when seen in plan view, and a load applied to the seat 16 from an occupant during acceleration of the vehicle can be supported.

The left and right the side pipe sections 55 are integrally formed of round steel pipes through bending or the like.

A fifth cross frame 47 bridges between the rear sections of the second extension sections 55c of the left and right the side pipe sections 55.

The fifth cross frame 47 is formed of a round steel pipe extending in the leftward/rightward direction.

The left and right subsidiary frame pipes 56 are bridged between the front sections of the second extension sections 32c of the left and right main frame pipes 32 and the longitudinal intermediate sections of the second extension sections 55c of the left and right the side pipe sections 55. The left and right subsidiary frame pipes 56 have front end portions 56f coupled to the front sections of the second extension sections 32c of the left and right main frame pipes 32, and rear end portions 56r coupled to the longitudinal intermediate sections of the second extension sections 55c of the left and right the side pipe sections 55.

The subsidiary frame pipes 56 include first extension sections 56a extending rearward from the front sections of the second extension sections 32c of the main frame pipes 32 to be inclined downward and rearward when seen in side view and extending to be inclined inward to the left and right when seen in plan view, and second extension sections 56c continuous with rear sides of the first extension sections 56a via first bent sections 56b, extending to form a linear shape with the first extension sections 56a when seen in side view and extending to be inclined outward to the left and right when seen in plan view.

The left and right subsidiary frame pipes 56 are integrally formed of round steel pipes through bending or the like. The round steel pipes that form the left and right subsidiary frame pipes 56 have a smaller diameter than that of the round steel pipe that forms the seat frame main body 45.

A sixth cross frame 49 bridges between the first bent sections 56b of the left and right subsidiary frame pipes 56.

A gusset plate 51 disposed along an upper edge of the subsidiary seat frame 46 when seen in side view bridges between the longitudinal intermediate sections of the left and right subsidiary frame pipes 56 (the front sections of the second extension sections 56c) and the sixth cross frame 49.

A gusset frame 52 bridges between rear upper sides of the second extension sections 56c of the subsidiary frame pipes 56 and rear upper sides of the second extension sections 55c of the side pipe sections 55.

Gusset plate 53 bridges between the front sections of the subsidiary frame pipes 56 and the longitudinal intermediate sections of the main frame pipes 32.

The sixth cross frame 49 is formed of a round steel pipe. The gusset plate 51 and the gusset frame 52 are formed of a steel plate through pressing. The gusset frame 52 is formed integrally with, for example, an attachment member 58, which will be described below.

Referring also to FIG. 1, the seat 16 is supported on the seat frame 25. The seat 16 has the rear section 16a that is supported by the rear section of the seat frame main body 45 (the rear sections of the first extension sections 55a of the left and right the side pipe sections 55, the second extension sections 55c and the rear curved sections 55e) from below and behind, and the front section 16b that is supported by the rear section of the subsidiary seat frame 46 (the second extension sections 56c of the left and right subsidiary frame pipes 56).

The rear section 16a of the seat 16 is formed in a wider shape overhanging outward in the vehicle width direction than the seat frame main body 45 to support an occupant's (a driver's) buttocks in a wide area.

The front section 16b of the seat 16 is formed in a narrow width shape having substantially the same width as a lateral width between the first bent sections 56b of the left and right subsidiary frame pipes 56 that form a minimum width of the subsidiary seat frame 46 to minimize opening of both legs of the occupant.

In the fuel tank 15 disposed in front of the seat 16, a tank rear section 15b that forms left and right knee grip sections 15a is formed to narrow a lateral width as it goes rearward, and easily sandwiched between both knees of a driver sitting on the seat 16. A lateral width of a rear end portion of the fuel tank 15 is substantially equal to a lateral width of a front end portion of the seat 16.

Figure 12:
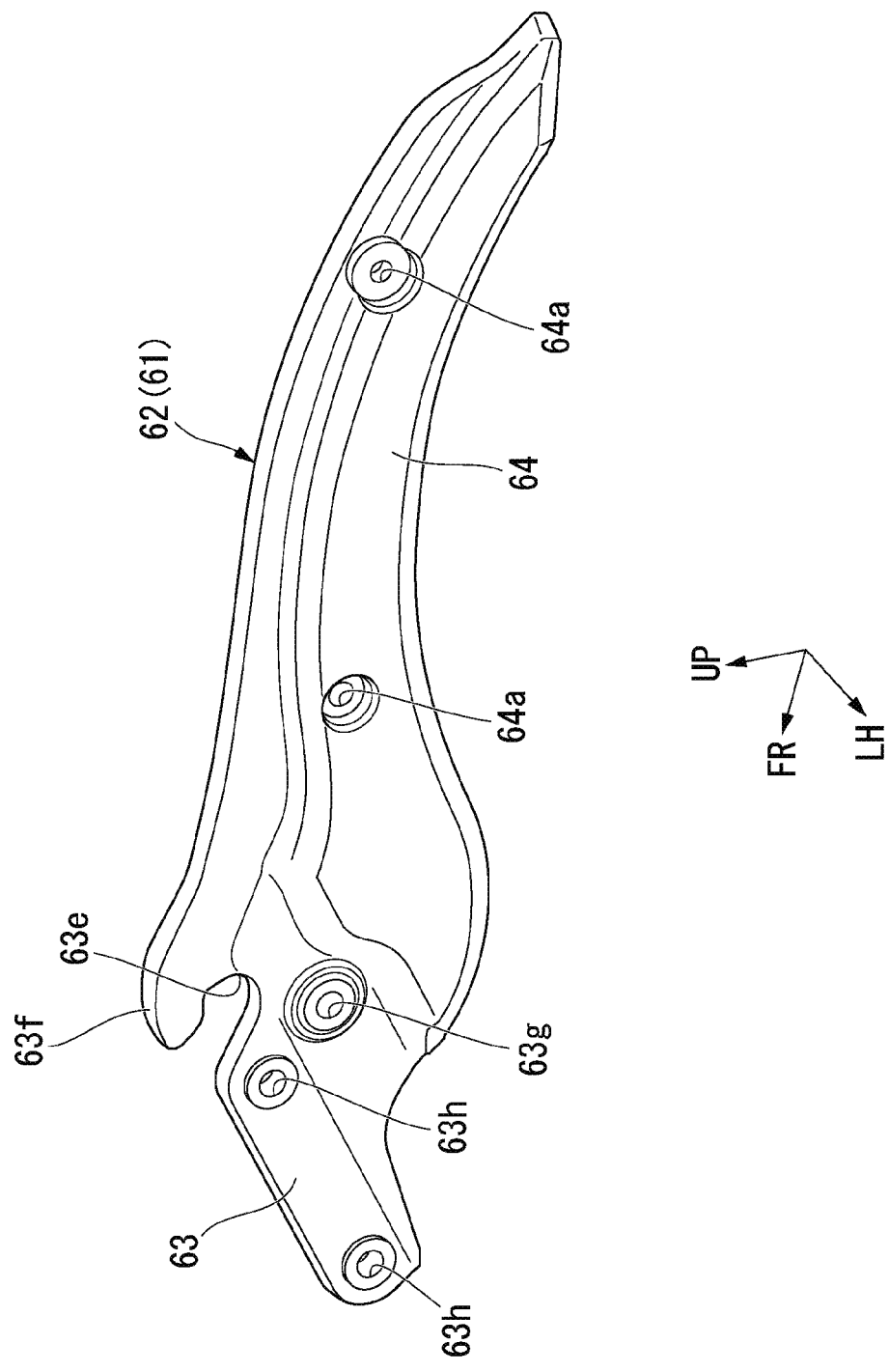
FIG. 12 is a perspective view of the rear frame.

As shown in FIG. 1, FIG. 3 and FIG. 12, a rear frame 61 including a pair of left and right rear frame main bodies 62 configured to support vehicle parts such as the rear fender 71 or the like is connected to a longitudinal intermediate section of the seat frame main body 45.

The left and right rear frame main bodies 62 are integrally formed of, for example, aluminum through casting or the like. The rear frame main bodies 62 are formed in a thick plate shape using the leftward/rightward direction as a thickness direction.

The rear frame main bodies 62 include frame base sections 63 disposed behind and below the upper sections of the second extension sections 55c in the side pipe sections 55 when seen in side view, and rear extension sections 64 extending rearward from the rear sections of the frame base sections 63 to form an arc shape protruding upward when seen in side view.

The frame base sections 63 are provided to partially overlap a cushion connecting bracket 59 and the upper sections of the rear cushions 9 when seen in side view. The frame base sections 63 are exposed as the vehicle appearance behind and below the seat frame main body 45 except for a portion overlapping the cushion connecting bracket 59 and the rear cushions 9. Appropriate weight reduction is performed inside the frame base sections 63 in the vehicle width direction to achieve reduction in weight while maintaining the appearance of having thickness.

The rear extension sections 64 are curved along a shape of the rear fender 71 (and the rear wheel 7) supported between the left and right rear frame main bodies 62 when seen in side view. The rear fender 71 includes a fender outer circumferential section 71a having the same curved shape as the outer circumferential surface (a tread surface) of the rear wheel 7, and a fender sidewall section 71b extending from a side edge to an inner circumferential side of the fender outer circumferential section 71a. A taillight unit 73 is supported by a rear end portion of the rear fender 71.

The rear extension sections 64 are provided along an outer side of the fender sidewall section 71b when seen in side view.

The rear extension sections 64 form outer surfaces that are flush with the frame base sections 63 to be exposed as the vehicle appearance. Longitudinal fastening sections 64a configured to fasten a fender inner 67 that connects the left and right rear frame main bodies 62 are provided on the rear extension sections 64. The fender inner 67 is a press-molded article, for example, a steel plate, formed along a lower surface of the fender outer circumferential section 71a, and supports the fender outer circumferential section 71a from an inner side (a lower side) of the rear fender 71. The pillion seat 75 for a passenger on the rear section is supported on the fender outer circumferential section 71a.

As shown in FIG. 8 to FIG. 11, an attachment section 57 configured to attach the frame base sections 63 disposed on a front end portion of the rear frame 61 and a bracket base section 91 disposed on an upper end portion of a pillion step bracket 90 is provided inside longitudinal intermediate sections of the second extension sections 55c of the left and right side pipe sections 55 in the vehicle width direction. The attachment section 57 includes an attachment boss 58c fixed to inner sides of the side pipe sections 55 in the vehicle width direction.

The attachment boss 58c is fixed to the side pipe sections 55 via the attachment member 58.

The attachment member 58 integrally has an attachment base section 58a extending in an extension direction of the second extension section 55c of the side pipe section 55 and curved along an outer circumferential surface of the second extension section 55c, and an extension section 58b extending in a direction in which the subsidiary frame pipe 56 extends from an intermediate section of the attachment base section 58a and curved along an outer circumferential surface of a rear section of the subsidiary frame pipe 56.

The attachment bosses 58c having female screw holes (not shown) are fixed to the attachment base section 58a at two places at an interval in an extension direction of the side pipe section 55. The attachment boss 58c is provided to protrude inward from the attachment base section 58a in the vehicle width direction.

A lower extension section 58d extending downward is provided on a rear end portion of the attachment member 58. The lower extension section 58d is provided integrally with the attachment base section 58a. The attachment base section 58a is disposed to face an inner side of the cushion connecting bracket 59 in the vehicle width direction fixed to an outer side of the side pipe sections 55 in the vehicle width direction.

The attachment base section 58a, the extension section 58b and the lower extension section 58d are integrally formed of a steel plate through pressing, casting, or the like. The attachment base section 58a is welded to an outer circumferential surface of a longitudinal intermediate section of the second extension section 55c of the side pipe section 55, the extension section 58b is welded to an outer circumferential surface of the rear end portion 56r of the subsidiary frame pipe 56, and the lower extension section 58d is welded to an outer circumferential section of the cushion connecting bracket 59 when seen in side view.

The attachment member 58 is joined to the rear end portions 56r of the subsidiary frame pipes 56 extending rearward from the pair of left and right main frame pipes 32 and the intermediate sections of the side pipe sections 55 to be provided to cross a joining portion therebetween. The attachment member 58 functions also as a reinforcement element of the joining portion between the rear end portions 56r of the subsidiary frame pipes 56 and the intermediate sections of the side pipe sections 55.

A fastening boss 58e protruding outward in the vehicle width direction is provided on the lower extension section 58d of the attachment member 58. The fastening boss 58e has a base section fixed to the lower extension section 58d through welding.

The cushion connecting brackets 59 extending downward from the side pipe sections 55 to be parallel to the lower extension section 58d are provided on outer sides of rear sections of the second extension sections 55c of the left and right the side pipe sections 55 in the vehicle width direction. The cushion connecting bracket 59 is formed of a steel plate through pressing, casting, or the like. The cushion connecting bracket 59 passes through a tip side of the fastening boss 58e to protrude outward in the vehicle width direction. Upper end portions of the left and right rear cushions 9 are connected to the fastening bosses 58e. The cushion connecting bracket 59 is coupled integrally with the lower extension section 58d of the attachment member 58.

Referring to FIG. 1, FIG. 3 and FIG. 12, the front sections of the frame base sections 63 of the rear frame main bodies 62 are disposed to overlap the longitudinal intermediate sections of the second extension sections 55c of the side pipe sections 55 and the attachment member 58 when seen in side view. The front sections of the frame base sections 63 are disposed inside the longitudinal intermediate section of the second extension sections 55c and the attachment member 58 in the vehicle width direction. Two bolt insertion holes 63h disposed at an interval in an extension direction of the second extension sections 55c of the side pipe sections 55 are formed in the front sections of the frame base sections 63. The two bolt insertion holes 63h are provided at positions facing the attachment bosses 58c of the attachment members 58 in the vehicle width direction.

Figure 13:
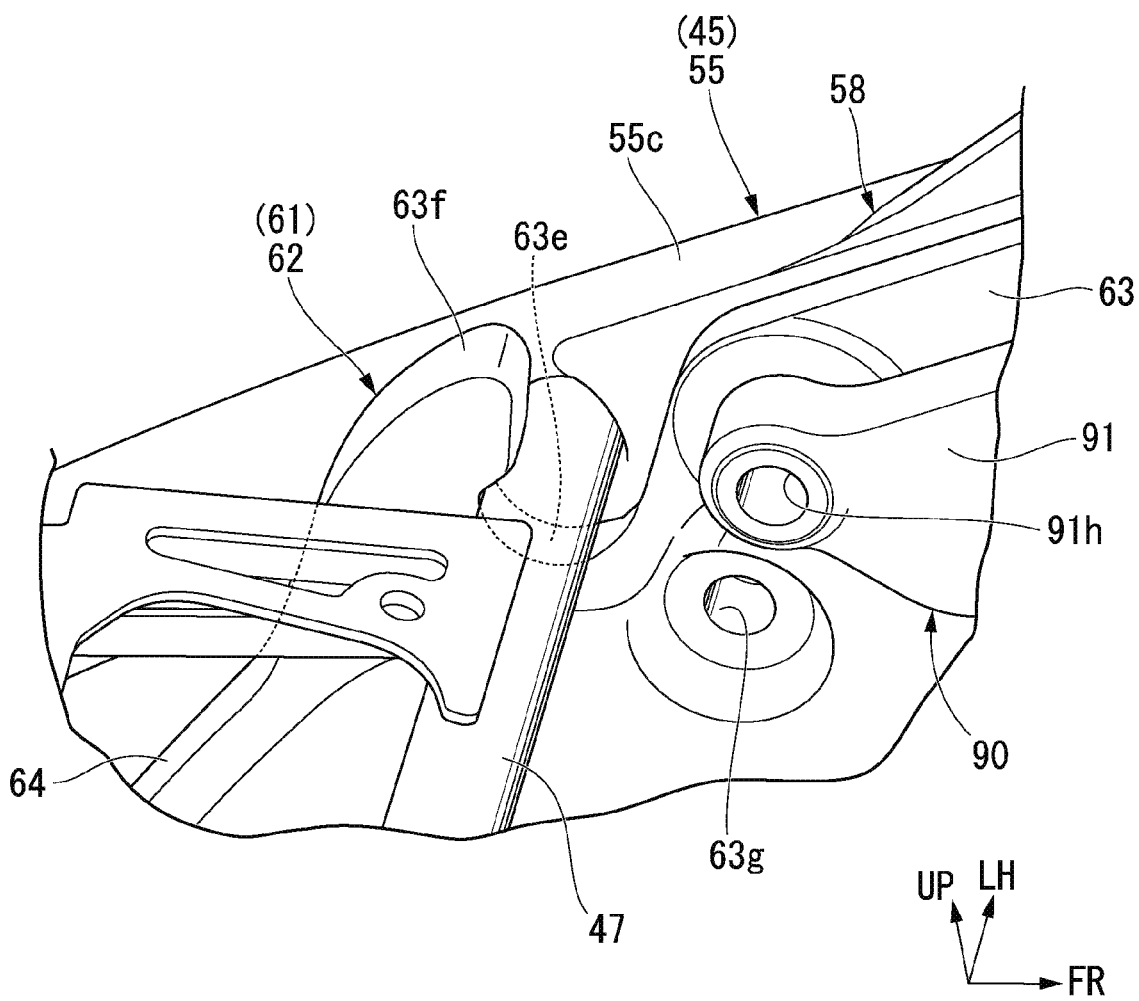
FIG. 13 is a perspective view in a state in which a hook section of the rear frame is locked to the vehicle body frame.
Figure 14:
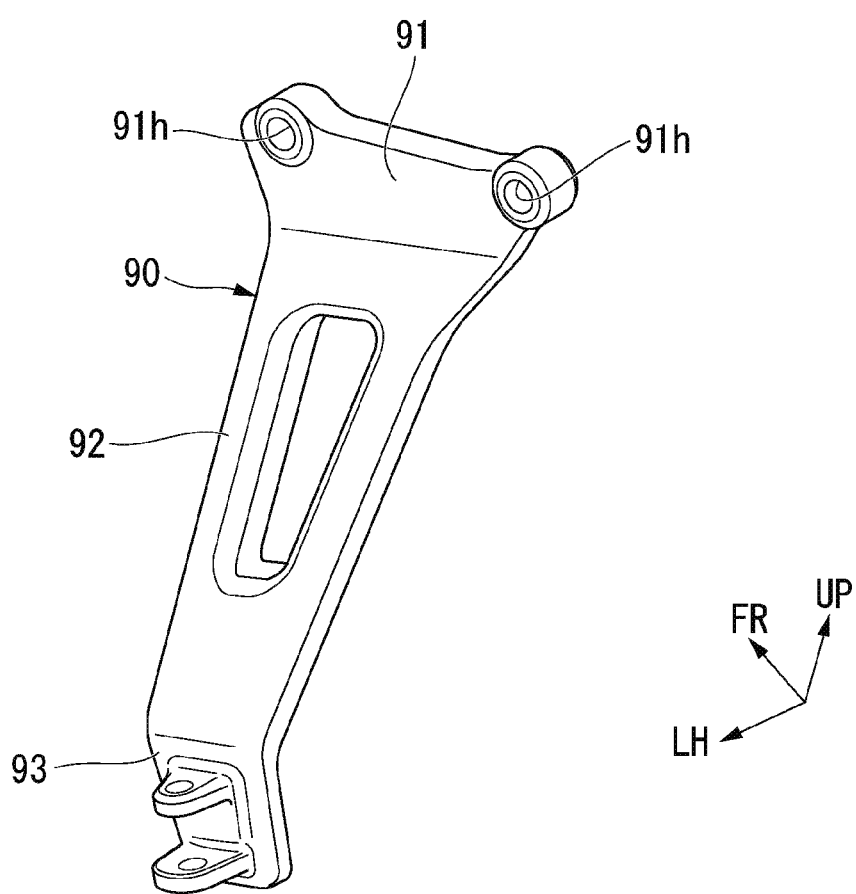
FIG. 14 is a perspective view of the pillion step bracket.

Referring also to FIG. 13, concave sections 63e forming a C shape when seen in side view and recessed rearward are formed in the front sections of the frame base sections 63 behind the two bolt insertion holes 63h. Hook sections 63f having arc shapes when seen in side view are formed on upper rear sides of the concave sections 63e. When side portions of the fifth cross frame 47 enter the concave sections 63e, the hook sections 63f are locked to the fifth cross frame 47, and the frame base sections 63 can be held at an assembly height.

Accordingly, when the rear frame 61 is assembled to the vehicle body frame 20, the rear frame main bodies 62 can be held while being easily and stably positioned, and an assembly work of the rear frame 61 becomes easy.

Through-holes 63g are formed in the front sections of the frame base sections 63 below the concave sections 63e. The front sections of the frame base sections 63 are fastened to inner ends of the fastening bosses 58e using the through-holes 63g.

As shown in FIG. 1, FIG. 3, FIG. 9 and FIG. 14, the pillion step bracket 90 includes the bracket base section 91 fixed to a longitudinal intermediate section of the second extension section 55c in the side pipe section 55 when seen in side view, and a downward extension section 92 extending downward from the bracket base section 91.

The bracket base section 91 is provided on the upper end portion of the pillion step bracket 90.

The bracket base section 91 is disposed to overlap the longitudinal intermediate section of the second extension section 55c of the side pipe section 55, the attachment member 58 and the frame base sections 63, when seen in side view. The bracket base section 91 is disposed inside the longitudinal intermediate section of the second extension section 55 and the attachment member 58 in the vehicle width direction. Two bolt insertion holes 91h are formed in the bracket base section 91 at an interval in an extension direction of the second extension sections 55c of the side pipe sections 55. The two bolt insertion holes 91h are disposed at positions facing the attachment boss 58c of the attachment member 58 and the frame base sections 63 in the vehicle width direction.

The downward extension section 92 extends to overhang outward in the vehicle width direction to be directed gradually downward from the bracket base section 91. A step support section 93 configured to support a pillion step 94 is provided on a lower end of the downward extension section 92.

The frame base section 63 of the rear frame 61 and the bracket base section 91 of the pillion step bracket 90 are fastened and fixed to the attachment member 58 provided on the intermediate section of the side pipe section 55 by a bolt 91b. The bolt 91b is inserted through the bolt insertion holes 91h and 63h from an inner side in the vehicle width direction, and screwed and fastened into the attachment boss 58c of the attachment member 58. Accordingly, the frame base section 63 of the rear frame 61 and the bracket base section 91 of the pillion step bracket 90 are fixed together to the attachment member 58.

Figure 6:
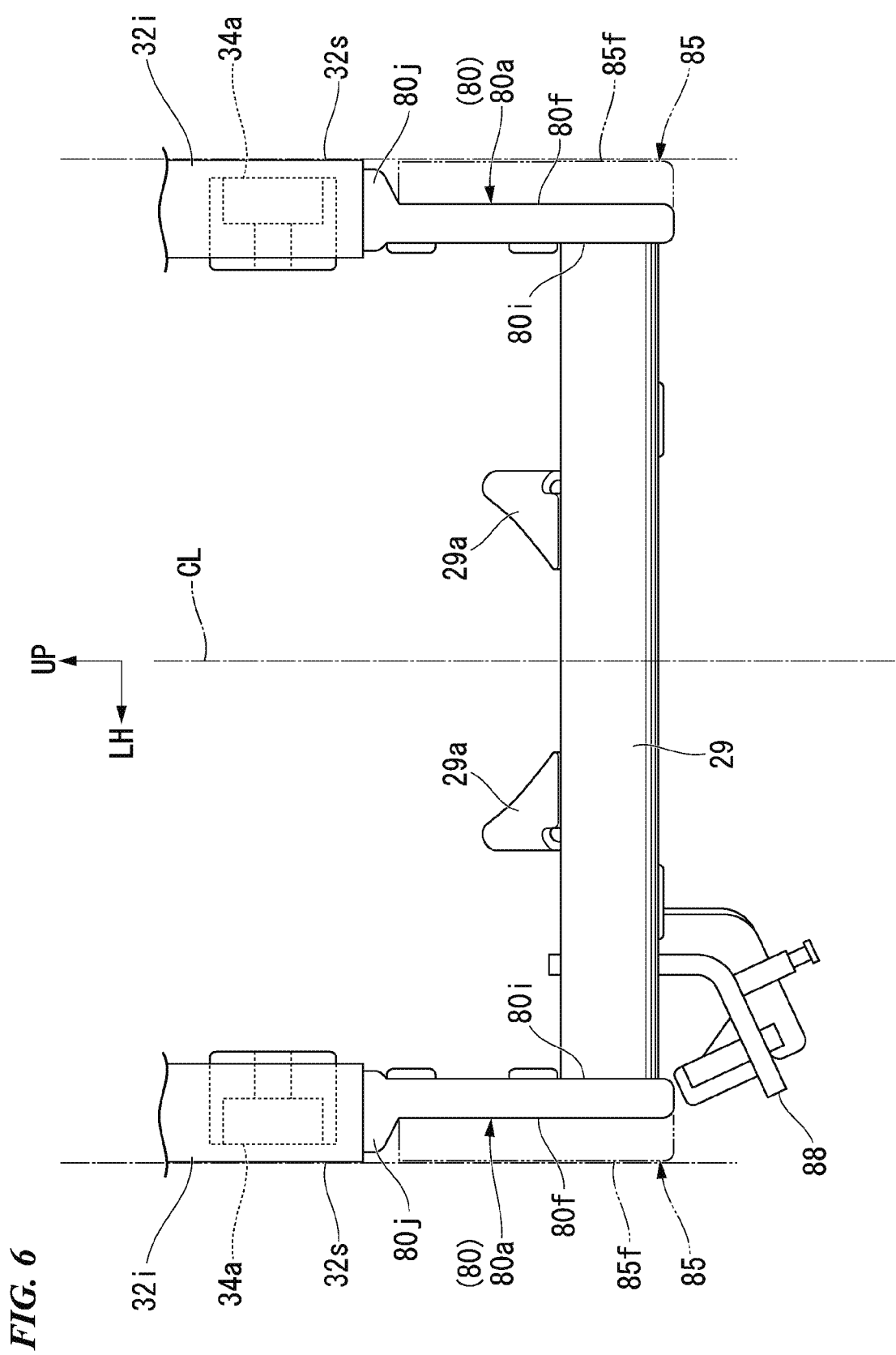
FIG. 6 is a rear view of the step bracket attachment section of the vehicle body frame.
Figure 7:
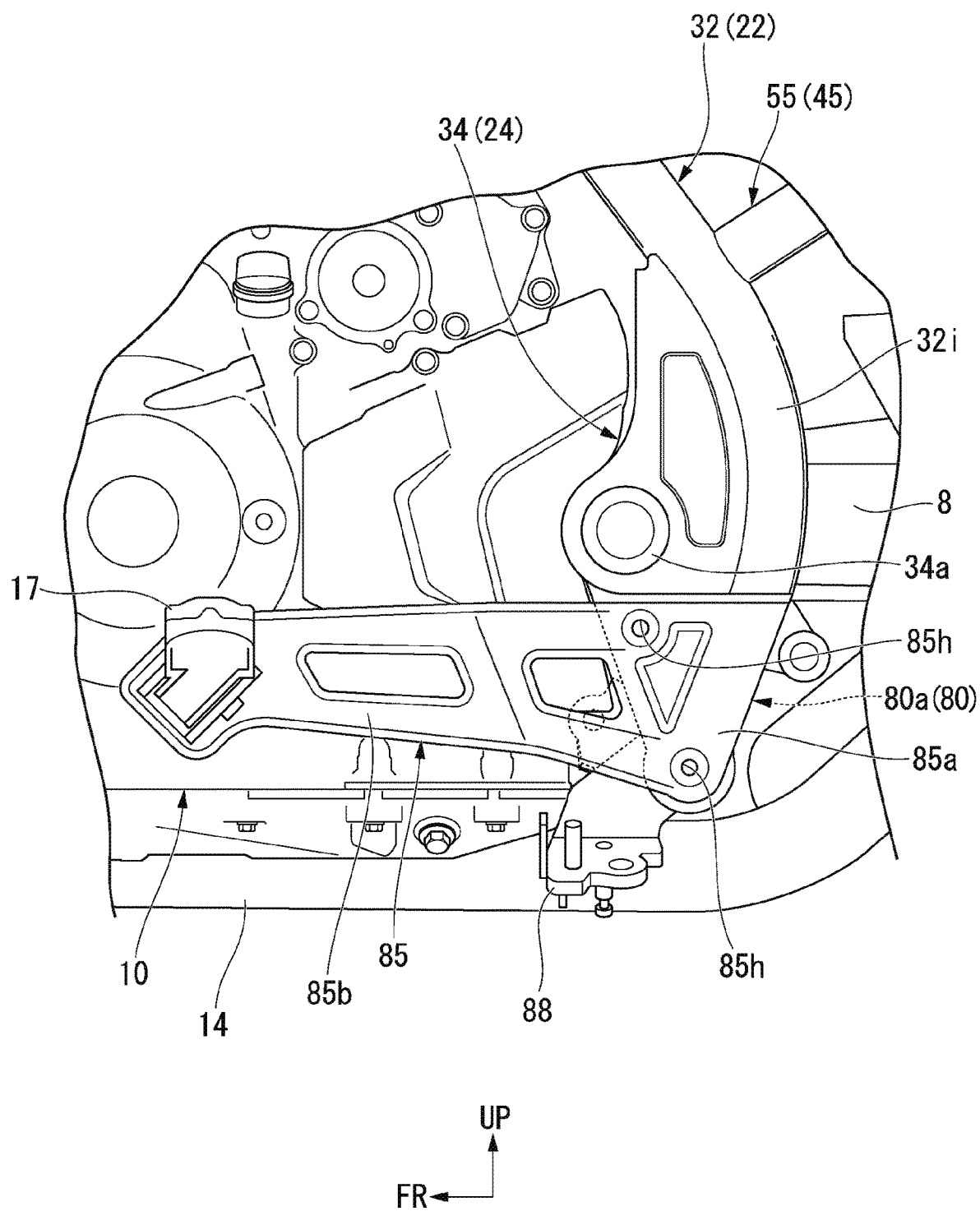
FIG. 7 is a left side view in a state in which a step bracket is attached to the step bracket attachment section.
Figure 8:
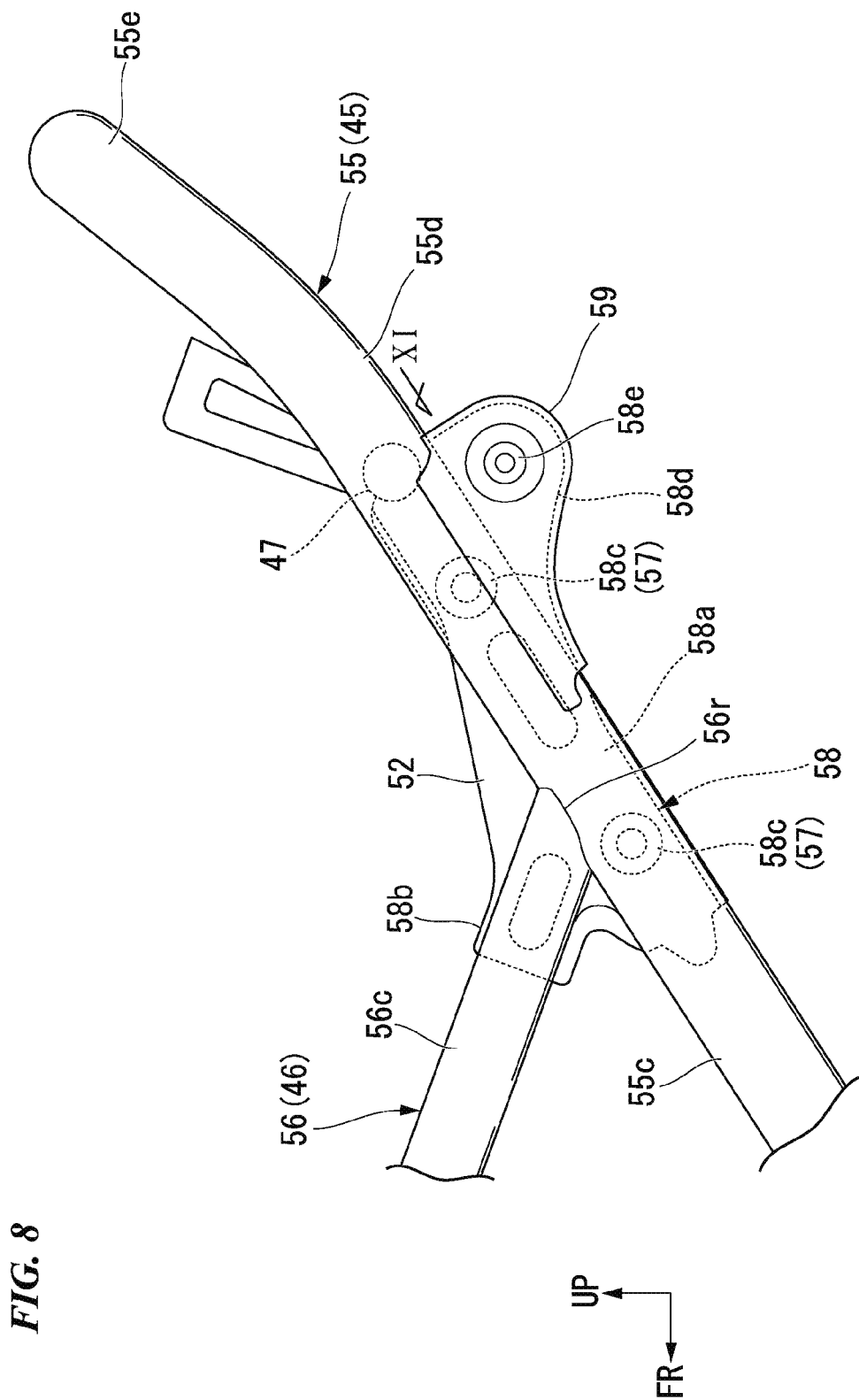
FIG. 8 is a left side view of a rear frame of a seat frame of the vehicle body frame and an attachment section of a pillion step bracket.
Figure 9:
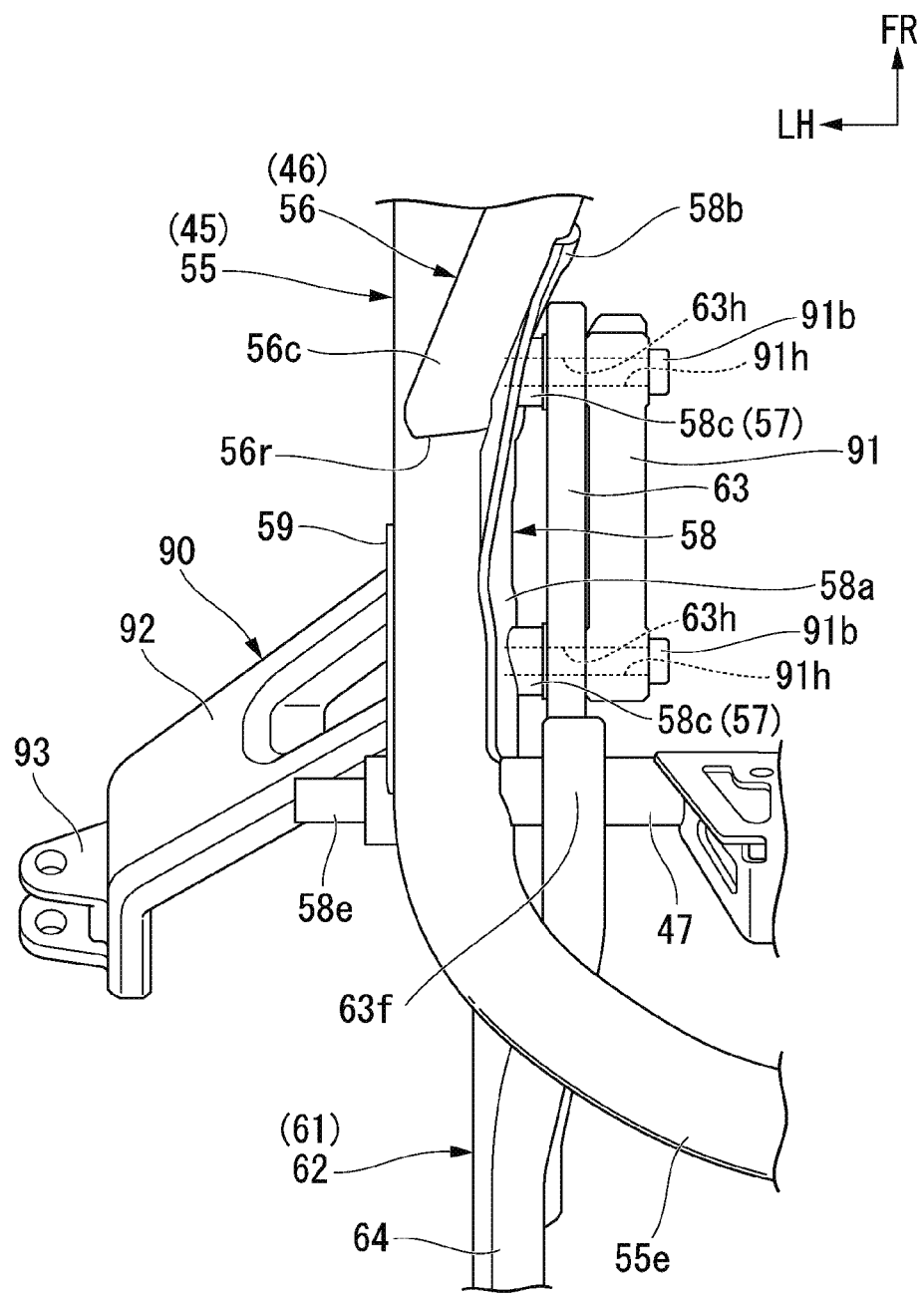
FIG. 9 is a top view of the attachment section.
Figure 10:
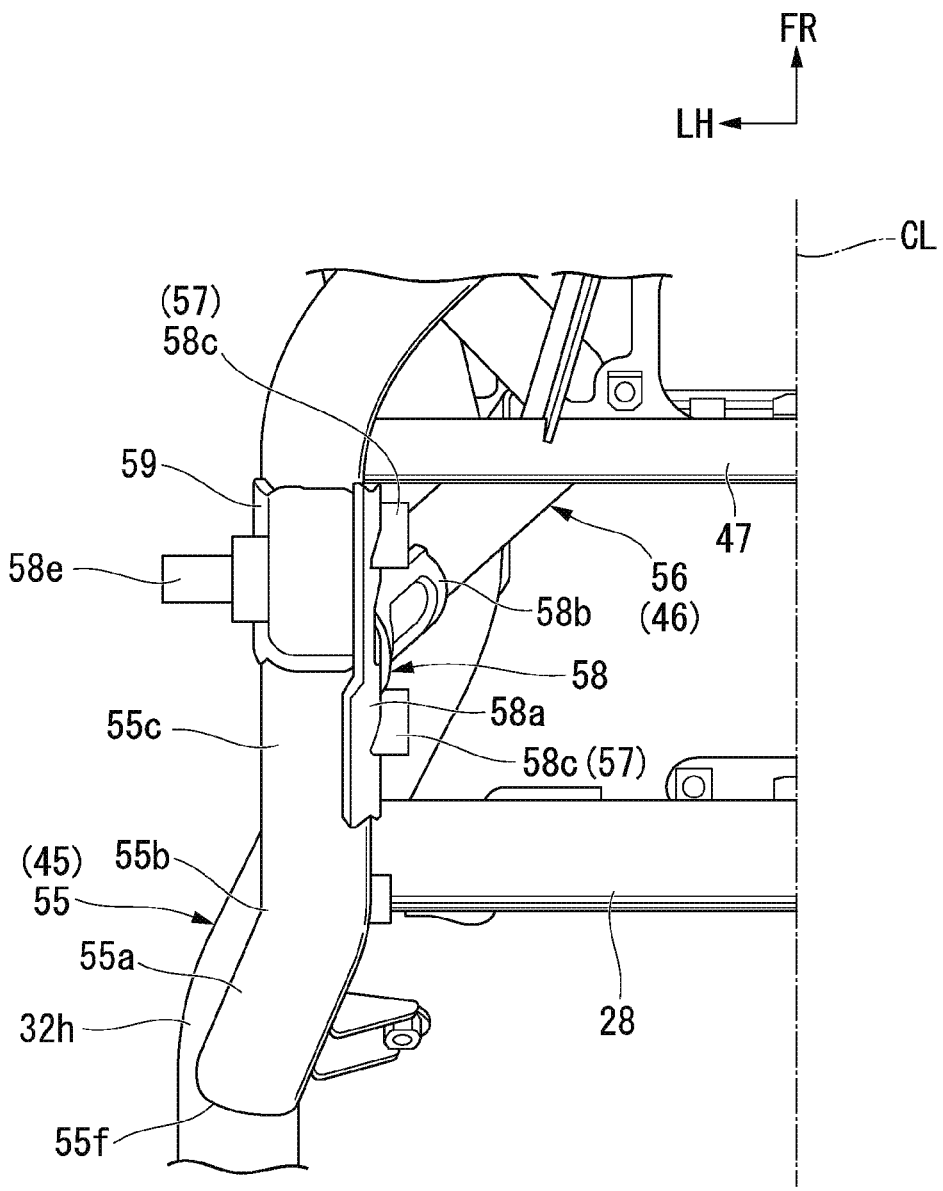
FIG. 10 is a rear view of the attachment section.
Figure 11:
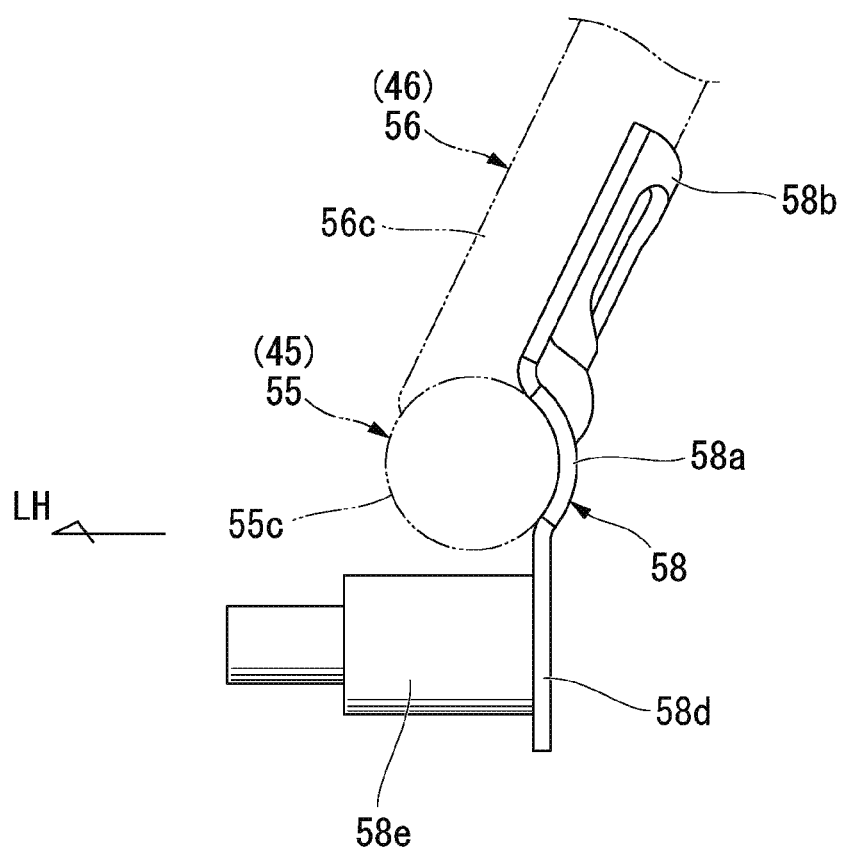
FIG. 11 is a view showing an attachment member of the attachment section taken along an arrow XI in FIG. 8.

Referring to FIG. 3, FIG. 4 and FIG. 6, in the embodiment, a width of the step bracket attachment sections 80 in the vehicle width direction is smaller than a width of the rear curved sections 32i of the main frame pipes 32 and the pivot plate members 34 in the vehicle width direction, and the outer surfaces 80f of the step bracket attachment sections 80 outside in the vehicle width direction are provided to be recessed further inward in the vehicle width direction than the rear curved sections 32i of the main frame pipes 32 and the outer surfaces 32s and 34s of the pivot plate members 34. The outer surfaces 85f of the step brackets 85 attached to outer sides of the step bracket attachment sections 80 in the vehicle width direction are disposed to be flush with the rear curved sections 32i of the main frame pipes 32 and the outer surfaces 32s and 34s of the pivot plate members 34.

Accordingly, the step brackets 85 are suppressed from protruding outward in the vehicle width direction, and when an occupant puts his/her feet on the steps 17, the feet are not interfered with by the step brackets 85, preventing the occupant from feeling discomfort. Since the outer surfaces 85f of the step brackets 85 are substantially flush with the rear curved sections 32i of the main frame pipes 32 and the outer surfaces 32s and 34s of the pivot plate members 34, differentiation of the appearance of the step brackets 85 is minimized, and the sense of unity with the vehicle body is enhanced.

As described above, the motorcycle 1 according to the embodiment includes the pivot frame 24 configured to support the swing arm 8, the step bracket attachment sections 80 continuous with a lower side of the pivot frame 24, and the step brackets 85 attached to the outer surfaces 80f of the step bracket attachment sections 80 outside in the vehicle width direction and configured to support the steps 17, the outer surfaces 80f of the step bracket attachment sections 80 are disposed further inside in the vehicle width direction than the outer surfaces 32s and 34s outside in the vehicle width direction of the pivot frame 24, and the outer surfaces 85f of the step brackets 85 outside in the vehicle width direction are disposed to be flush with the outer surfaces 32s and 34s of the pivot frame 24.

According to the configuration, since the outer surfaces 80f of the step bracket attachment sections 80 outside in the vehicle width direction are disposed further inside in the vehicle width direction than the outer surfaces 32s and 34s of the pivot frame 24 outside in the vehicle width direction, the step brackets 85 can be attached using the recesses in the vehicle width direction formed by the step bracket attachment sections 80. Since the outer surfaces 85f of the step brackets 85 outside in the vehicle width direction are disposed to be flush with the outer surfaces 32s and 34s of the pivot frame 24 outside in the vehicle width direction, outward overhanging of the step brackets 85 in the vehicle width direction can be minimized. Accordingly, it is possible to minimize discomfort to an occupant due to interference between feet of the occupant placed on the steps 17 and the step brackets 85. Since the outer surfaces 85f of the step brackets 85 and the outer surfaces 32s and 34s of the pivot frame 24 are flush with each other, differentiation of the appearance of the step brackets 85 is minimized and the sense of unity with the vehicle body is enhanced, and thus, design properties can be improved.

The motorcycle 1 includes the head pipe 21, the pair of left and right main frame pipes 32 extending from the head pipe 21 toward a rear side of the vehicle, the pair of left and right pivot plate members 34 joined to the rear curved sections 32i of the pair of left and right main frame pipes 32 and constituting the pivot frame 24, and the pair of left and right bracket attachment members 80a joined to the lower ends of the pair of left and right pivot plate members 34 and constituting the step bracket attachment sections 80, wherein each of the bracket attachment members 80a is formed to be thinner than each of the pivot plate members 34 in the vehicle width direction.

According to the configuration, when the thickness of the bracket attachment members 80a in the vehicle width direction is smaller than the thickness of the pivot plate members 34 in the vehicle width direction, the outer surfaces 80f of the step bracket attachment sections 80 outside in the vehicle width direction can be disposed further inside in the vehicle width direction than the outer surfaces 32s and 34s of the pivot frame 24 outside in the vehicle width direction, and outward overhanging of the step brackets 85 in the vehicle width direction can be minimized.

In the motorcycle 1, the bracket attachment members 80a are forged members formed of a metal-based material, and welded to the pivot plate members 34.

According to the configuration, the pivot frame 24 can be reinforced by welding and coupling the bracket attachment members 80*a* to the pivot plate members 34 while securing strength and rigidity using the bracket attachment members 80*a* as the forged members and increasing support rigidity of the step brackets 85.

In the motorcycle 1, the pair of left and right bracket attachment members 80*a* are connected to each other via a cross pipe 29 extending in the vehicle width direction between the pair of left and right bracket attachment members 80*a*.

According to the configuration, since the left and right bracket attachment members 80*a* are connected to each other by the cross pipe 29, the step bracket attachment sections 80 can be strengthened to increase vehicle body rigidity. Since the left and right bracket attachment members 80*a* support both ends of the cross pipe 29, support rigidity when an engine, a suspension, and the like, are supported by the cross pipe 29 can be increased.

The motorcycle 1 includes the main frame 22 configured to support the pivot frame 24, the seat frame 25 extending rearward from the main frame 22 and configured to support the seat 16, the rear frame 61 configured to support vehicle parts (the rear fender 71 or the like) behind the seat 16, and the pair of left and right pillion step brackets 90 configured to support the pillion step 94, wherein the attachment section 57 configured to fix the rear frame 61 and the pillion step brackets 90 together is provided on the seat frame 25.

According to the configuration, since the attachment section 57 configured to fix the rear frame 61 and the pillion step bracket 90 together is provided on the seat frame 25, a structure for attaching the rear frame 61 and the pillion step bracket 90 can be simplified, and the number of parts and installation man-hours can be reduced.

In the motorcycle 1, the rear frame 61 and the pillion step bracket 90 are attached to the attachment section 57 of the seat frame 25 from an inner side in the vehicle width direction.

According to the configuration, since the rear frame 61 and the pillion step bracket 90 are attached from an inner side in the vehicle width direction, an attachment structure of the rear frame 61 and the pillion step bracket 90 can improve design properties without being exposed to the outside in the vehicle width direction. Even when the rear frame 61 and the pillion step bracket 90 are removed, the attachment section of the rear frame 61 and the pillion step bracket 90 can improve design properties without being exposed to the outside in the vehicle width direction.

In the motorcycle 1, the seat frame 25 includes the seat frame pipe 55 extending rearward from the main frame 22, and the subsidiary frame pipes 56 extending rearward from the main frame 22 and joined to the longitudinal intermediate section of the seat frame pipe 55, wherein the attachment section 57 is provided on the longitudinal intermediate section of the seat frame pipe 55, and the attachment section 57 is provided on the attachment member 58 and joined to cross the seat frame pipe 55 and the subsidiary frame pipes 56.

According to the configuration, since the attachment section 57 configured to attach the rear frame 61 and the pillion step bracket 90 is provided on the attachment member 58 joined to across the seat frame pipe 55 and the subsidiary frame pipes 56 at the joining position of them, the joining portion of the seat frame pipe 55 and the subsidiary frame pipes 56 can be reinforced by the attachment member 58 while increasing support rigidity of the rear frame 61 and the pillion step bracket 90.

Further, the present invention is not limited to the above-mentioned embodiments described with reference to the accompanying drawings, and it is conceivable that various modifications may be made without departing from the spirit of the present invention, For example, the main frame 22, the pivot frame 24, the seat frame 25, the step bracket attachment sections 80 and the rear frame 61 are not limited to the configuration in which a pair of left and right (separate) members are provided, and may have a configuration in which a laterally integrated member is provided. The vehicle parts supported by the rear frame 61 are not limited to the rear fender 71 and may be a rear seat, a cargo stand, an assist grip, electrical components, exterior parts, various containers, and the like. Suspension parts may be connected to the rear frame 61.

In addition, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included, and a vehicle in which an electric motor is included in a prime mover may also be included.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A saddle riding vehicle comprising a pivot frame configured to support a swing arm, a step bracket attachment section continuous with a lower side of the pivot frame, and a step bracket attached to an outer surface of the step bracket attachment section outside in a vehicle width direction and configured to support a step,
    wherein the outer surface of the step bracket attachment section is provided further inside in the vehicle width direction than outer surfaces of the pivot frame outside in the vehicle width direction, and
    an outer surface of the step bracket outside in the vehicle width direction is disposed to be arranged on a same surface as the outer surfaces of the pivot frame.

2. The saddle riding vehicle according to claim 1, wherein a head pipe, a pair of left and right main frame pipes extending from the head pipe toward a rear side of the vehicle, a pair of left and right pivot plate members joined to rear lower end portions of the pair of left and right main frame pipes and constituting the pivot frame, and a pair of left and right bracket attachment members joined to lower ends of the pair of left and right pivot plate members and constituting the step bracket attachment section are provided, and
    each of the bracket attachment members is formed to be thinner than each of the pivot plate members in the vehicle width direction.

3. The saddle riding vehicle according to claim 2, wherein the bracket attachment members are forged members formed of a metal-based material, and welded to the pivot plate member.

4. The saddle riding vehicle according to claim 2, wherein the pair of left and right bracket attachment members are connected to each other via a cross pipe extending in the vehicle width direction between the pair of left and right bracket attachment members.

5. The saddle riding vehicle according to claim 1, wherein a main frame configured to support the pivot frame, a seat frame extending toward a rear side of the main frame and configured to support a seat, a rear frame configured to support vehicle parts behind the seat, and a pair of left and right pillion step brackets configured to support a pillion step are provided, and an attachment section configured to fix the rear frame and the pillion step brackets together is provided on the seat frame.

6. The saddle riding vehicle according to claim 5, wherein the rear frame and the pillion step brackets are attached to the attachment section of the seat frame from an inner side in the vehicle width direction.

7. The saddle riding vehicle according to claim 5, wherein the seat frame comprises a seat frame pipe extending rearward from the main frame, and a subsidiary frame pipe extending rearward from the main frame and joined to a longitudinal intermediate section of the seat frame pipe, the attachment section is provided on the longitudinal intermediate section of the seat frame pipe, and the attachment section is provided on an attachment member joined to cross the seat frame pipe and the subsidiary frame pipe.

\* \* \* \* \*